Figure 1:
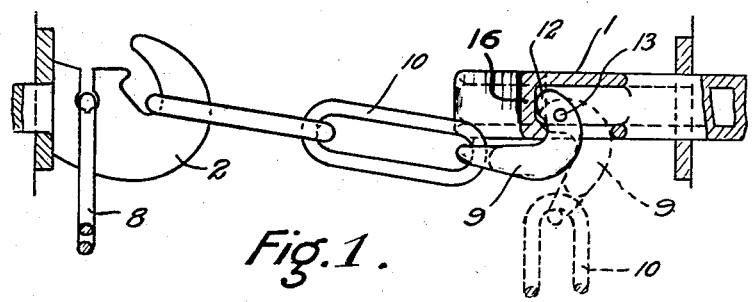

Nov. 3, 1931.  A. W. BLAIR  1,829,819
MEANS OF COUPLING ROLLING STOCK
Filed May 8, 1928

A. W. Blair
INVENTOR

By: Marks & Clerk
Att'ys.

Patented Nov. 3, 1931

1,829,819

UNITED STATES PATENT OFFICE

ARCHIBALD WILLIAM BLAIR, OF AUCKLAND, NEW ZEALAND

MEANS OF COUPLING ROLLING STOCK

Application filed May 8, 1928. Serial No. 276,148.

In my co-pending application for Letters Patent Serial Number 276,149, filed May 8, 1928, I have described an automatic coupling arrangement of novel and advantageous design, and I have also shown how, with various modifications, my improved coupling apparatus may be used on vehicles not fitted with automatic coupling apparatus during what I have therein called the "transition period" to couple up with vehicles of the centre buffer and hook type of non-automatic coupling.

The present invention is devised with the object of showing means for applying my improved coupling apparatus to couplers of the ordinary chain and hook type, or the turnbuckle and hook type, during such transition period, it being understood that when such transition period is over my coupling apparatus will be identical with that shown and described in my co-pending application, and accordingly as a full description of such apparatus is therein given I shall confine myself in the present application merely to the particular application of my improved automatic coupling mechanism to the chain and hook type, or the turnbuckle and hook type of coupling during the transition period.

It must be clearly understood however that although I have described my present invention with particular reference to my improved type of coupler, the scope of the invention is not limited thereto but is equally applicable to any usual type of coupler of the chain and hook or turnbuckle and hook type of coupler.

As will be hereinafter more clearly shown the placing of the transition hook during the transition period in relation to the coupler head is so disposed that the knuckle and the locking pin can be mounted during such period, thus providing for the automatic working of the coupler head during such period when two of my automatic coupler heads meet. This result is accomplished by means of the transition hook being housed to one side of the coupler head, and on the under side thereof, thus allowing the partial rotation of the knuckle.

Under working conditions when one vehicle is fitted with a centre chain and hook coupler and the adjacent vehicle fitted with a coupler of the type herein described, the chain attached to applicant's hook within the coupler head is raised from the vertical hanging position, to a horizontal position, and engaged with the hook of the centre chain and hook coupler, the knuckle of applicant's coupler head being in the open position.

In the case where one of my coupler heads is adjacent on each of the vehicles to be coupled together during the transition period, the chain with my hook in each case hangs vertical, clear of the knuckle, on the underside of the coupler head, and permits of rotation of the knuckle and permits the automatic coupling of the vehicles.

The invention is clearly illustrated in the accompanying drawings, in which: Figure 1 is an elevation showing one way of coupling two vehicles together with the chain during the said transition period, and in which my improved coupler head is used together with a suitable hook adapted to be used within same on the one vehicle and a known hook on the other vehicle, Figure 2 is a plan view partly sectioned of Figure 1 showing my improved form of hook and coupler head, and Figure 3 is an adaptation of the improved hook shown in Figure 1 as used during said transition period in conjunction with a known form of turnbuckle and shackle as commonly used on passenger stock.

Referring now to the drawings the point 12 of the hook 9 is housed within the coupler head 1, being passed vertically upwards through a suitably shaped hole 11 in the lower flange of the coupler head 1. The point 12 of the hook 9 is maintained in the desired position by suitable means such as a pin 13 securely fixed by any known means to the hook 9, the said pin 13 projecting laterally on both sides of the hook 9. These projecting ends are designed to support the hook 9 and permit same to slide or have rotary movement. In Figure 3 the hook 9 is shown attached for use with the centre hook coupling where the usual known type of turnbuckle 14 and shackles 15 are used.

Figure 2:
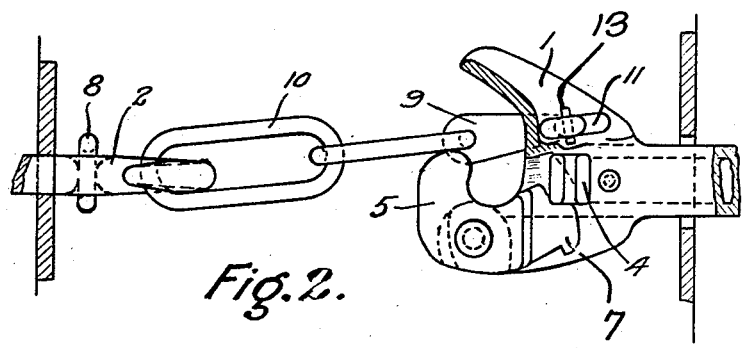

In Figures 1 and 2 is shown the application of my improved coupling apparatus coupled during the transition period with the coupling of the centre chain and hook type wherein a special hook 9 previously described, is securely housed within the coupler head 1. It will be noted that the coupler head 1 in this case is fitted with knuckle 5 and locking pin 4 complete with all attachments providing for automatic coupling when two vehicles meet, each being fitted with this coupler head, the hook 9 being so placed on one side of coupler head 1 that the said hook 9 and attached chain 10 will hang vertically clear to allow of the rotation of the tail 7 of the knuckle 5 during automatic coupling.

Figure 3:
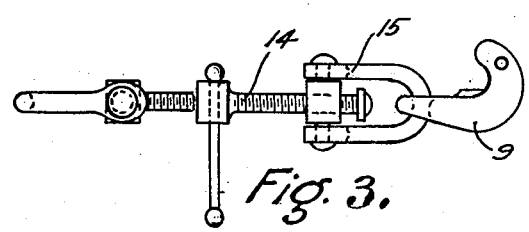

With respect to the centre turnbuckle and shackle type shown in Figure 3 the operation is similar to that described for Figures 1 and 2.

In connection with the foregoing, attention is particularly directed to the fact that the bill 12 of the hook 9 in the operative position as shown in Fig. 1, engages the rear vertical face of the guard arm 16, relieving the pin and slot connection of any strain incident to the use of the device. The pin 13 merely serves to pivotally and slidably support the hook on the head when the auxiliary coupling means is in an idle position as indicated in dotted lines in Fig. 1.

Claim.

Transitional coupling means for railway cars comprising in combination, a coupler head of the Janney type provided with a laterally extending arm having a rear vertical face and upper and lower rearwardly projecting flange portions extending from the arm, the lower of said flange portions being provided with a slot, a hook having its bill arranged through the slot and in operative position engaging the rear vertical face of the arm, a pin traversing the bill and resting on the flanged portion on opposite sides of the slot for pivotally and slidably connecting the hook to the head, and auxiliary coupling means connected to the opposite free end of the hook.

ARCHIBALD WILLIAM BLAIR.